US012451241B2

(12) United States Patent
Guller et al.

(10) Patent No.: US 12,451,241 B2
(45) Date of Patent: Oct. 21, 2025

(54) PREDICTING FAILURE OF A MEDICAL DEVICE PART USING OPERATIONAL AND NON-OPERATIONAL DATA

(71) Applicant: Glassbeam, Inc., Santa Clara, CA (US)

(72) Inventors: Mohammed Guller, Danville, CA (US); Deepak Nailwal, Bengaluru (IN)

(73) Assignee: Glassbeam, Inc., Santa Clara, CA (US)

( * ) Notice: Subject to any disclaimer, the term of this patent is extended or adjusted under 35 U.S.C. 154(b) by 3 days.

(21) Appl. No.: 18/444,507

(22) Filed: Feb. 16, 2024

(65) Prior Publication Data

US 2024/0290475 A1 Aug. 29, 2024

Related U.S. Application Data

(60) Provisional application No. 63/446,704, filed on Feb. 17, 2023.

(51) Int. Cl.
*G16H 40/20* (2018.01)
*G16H 40/40* (2018.01)

(52) U.S. Cl.
CPC ............. *G16H 40/20* (2018.01); *G16H 40/40* (2018.01)

(58) Field of Classification Search
CPC ............................... G16H 40/20; G16H 40/40
USPC ......................................................... 705/2–3
See application file for complete search history.

(56) References Cited

U.S. PATENT DOCUMENTS

| 8,165,849 B2* | 4/2012 | Mannar | A61B 5/7257 702/183 |
| 8,190,445 B2* | 5/2012 | Kuth | G16H 40/20 705/1.1 |
| 8,896,439 B2* | 11/2014 | Mercer | G08B 21/185 340/286.07 |
| 10,424,045 B2* | 9/2019 | Park | G06T 7/344 |
| 10,579,928 B2 | 3/2020 | Wang | |

(Continued)

FOREIGN PATENT DOCUMENTS

| WO | WO-2014043623 A1 * | 3/2014 | .............. G06N 7/00 |
| WO | WO-2015098697 A1 * | 7/2015 | ........... G01F 15/005 |

(Continued)

OTHER PUBLICATIONS

Patil et al. Predictive Modeling for Corrective Maintenance of Imaging Devices from Machine Logs. Conf Proc IEEE Eng Med Biol Soc. Jul. 2017.

(Continued)

*Primary Examiner* — Michael Tomaszewski
(74) *Attorney, Agent, or Firm* — Van Pelt, Yi & James LLP

(57) ABSTRACT

Data is received from a plurality of devices each having a same target part subject to failure. The received data is used to determine, for each of at least a subset of the plurality of devices, a part failure date on which the target part failed in that device. A set of features usable to predict failure of the target part is engineered, the set of features including one or more features that are not based on logged warning or error events. At least a subset of the data is labeled and aggregated over one or more days. The labeled and aggregated data is used to train a machine learning model configured to be used to predict failure of the target part in a device based on recent data from that device, including by computing from the data features corresponding to the programmatically engineered a set of features.

22 Claims, 10 Drawing Sheets

(56) References Cited

U.S. PATENT DOCUMENTS

| | | | | |
|---|---|---|---|---|
| 11,728,027 | B2* | 8/2023 | Junker | G06Q 10/06312 700/90 |
| 11,935,646 | B1* | 3/2024 | Guller | G06N 7/01 |
| 2009/0254362 | A1* | 10/2009 | Choubey | G16H 40/20 705/2 |
| 2012/0226771 | A1* | 9/2012 | Harrington | G16H 40/67 709/217 |
| 2014/0266713 | A1* | 9/2014 | Sehgal | G08B 23/00 340/540 |
| 2015/0227838 | A1* | 8/2015 | Wang | G16H 40/40 706/12 |
| 2016/0153806 | A1* | 6/2016 | Ciasulli | G06F 11/26 702/183 |
| 2017/0011101 | A1* | 1/2017 | Venkatesan | G06F 16/2246 |
| 2020/0185085 | A1* | 6/2020 | Mavrieudus | G06N 20/00 |
| 2020/0272139 | A1* | 8/2020 | Rakuff | G06F 17/142 |
| 2020/0371858 | A1* | 11/2020 | Hayakawa | G06F 11/0793 |
| 2021/0048809 | A1* | 2/2021 | Zhang | G06N 3/088 |
| 2021/0065888 | A1* | 3/2021 | Page | G06F 3/04847 |
| 2021/0124342 | A1* | 4/2021 | Shukla | G05B 23/0283 |
| 2021/0174951 | A1* | 6/2021 | Fujita | G05B 23/0297 |
| 2021/0193305 | A1* | 6/2021 | Junker | G16H 10/40 |
| 2021/0303378 | A1* | 9/2021 | Sethi | G06F 18/2178 |
| 2024/0290475 | A1* | 8/2024 | Guller | G16H 40/20 |

FOREIGN PATENT DOCUMENTS

| | | | |
|---|---|---|---|
| WO | 2015125041 | 8/2015 | |
| WO | WO-2015125041 A1 * | 8/2015 | ............ G06F 11/079 |
| WO | WO-2019035986 A1 * | 2/2019 | ............. G16H 40/40 |
| WO | WO-2019142331 A1 * | 7/2019 | .......... G06F 11/0778 |

OTHER PUBLICATIONS

Sipos et al. Log-Based Predictive Maintenance. KDD '14 Proceedings of the 20th ACM SIGKDD international conference on Knowledge discovery and data mining. Aug. 24-27, 2014.

Wang et al. Predictive Maintenance Based on Event-Log Analysis: A Case Study. IBM Journal of Research and Development. vol. 61, Issue 1, Jan., Feb. 2017.

* cited by examiner

PREDICTING FAILURE OF A MEDICAL DEVICE PART USING OPERATIONAL AND NON-OPERATIONAL DATA

CROSS REFERENCE TO OTHER APPLICATIONS

This application claims priority to U.S. Provisional Patent Application No. 63/446,704 entitled PREDICTING FAILURE OF A MEDICAL DEVICE PART USING OPERATIONAL AND NON-OPERATIONAL DATA filed Feb. 17, 2023 which is incorporated herein by reference for all purposes.

BACKGROUND OF THE INVENTION

Installed equipment may generate logs reflecting use and other events associated with the equipment, such as errors, warnings, part readings, etc. These logs may be sent (e.g., periodically, streamed in real time, etc.) to a central repository, e.g., for storage and/or analysis.

An example of installed equipment are medical devices, such as medical imaging devices, diagnostic equipment, lab testing, etc. The term "medical devices" refer to machines that are used for medical diagnosis, clinical lab tests, patient tests, or patient care. The term "medical imaging device" refers to machines that are used to view the human body for diagnosing medical conditions. Examples of such device include X-Ray, Computed Tomography (CT), Magnetic Resonance Imaging (MRI), and Ultrasound machines. Other examples of medical equipment include defibrillator, EKG/ECG machine, patient monitor, anesthesia machine, X-Ray machine, digital mammography machine, nuclear medicine machine, PET-CT, Molecular Diagnostic Systems, etc.

A medical device has many parts that fail and may need to be replaced several times during its lifespan. The traditional approaches for handling part or component failure for medical devices include replacing a part when it fails (a reactive approach) or replacing a part on a predetermined maintenance schedule (a proactive approach). In the former case (replace on failure), the failure occurs at an unexpected time and can lead to extended down time (e.g., to obtain the part, to schedule the technician, etc.). In the latter case, the part may have material service life remaining at the time it is replaced.

Generally, a medical device consists of multiple subsystems and parts. Some of these are critical for proper functioning of a medical device. A medical device becomes unusable if one of these fails. A machine learning model that predicts failure of such parts or subsystems ahead of time enables a device owner, operator, or a service organization to proactively plan for such an event and reduce unplanned downtime.

BRIEF DESCRIPTION OF THE DRAWINGS

Various embodiments of the invention are disclosed in the following detailed description and the accompanying drawings.

DETAILED DESCRIPTION

Figure 1:
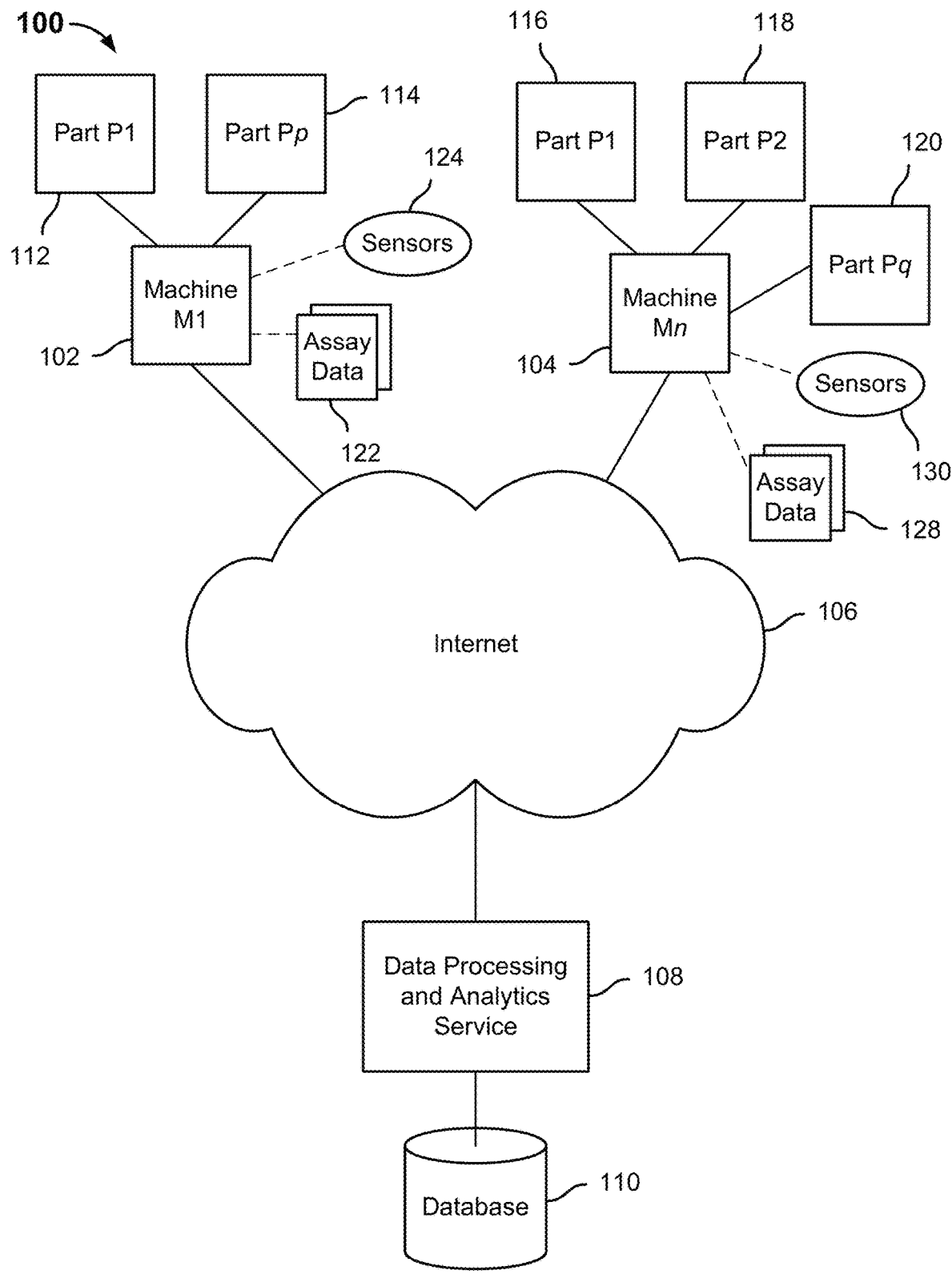
FIG. 1 is a block diagram illustrating an embodiment of a system to process and analyze data generated by a medical device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to predict failure of a medical device part. In various embodiments, data generated, saved, and/or otherwise associated with a medical device (system) is, e.g., equipment machine data, sensor readings, and assay data, are used to train a machine learning model. The model is used to predict part failure. In various embodiments, a part failure prediction model is trained using data from both devices that have experienced failure of the same part and devices that still have the same part in good operational condition.

Prior U.S. application Ser. No. 16/365,205, filed Mar. 26, 2019, entitled PREDICTING MEDICAL DEVICE FAILURE BASED ON OPERATIONAL MACHINE DATA, disclosed techniques to make part failure predictions based on errors, warnings, and other events extracted from log files. In various embodiments, techniques disclosed herein are used to extend the input data used for part failure prediction to other sources that store information about patient exams, tests, assays, or studies run on a medical device as well as readings for different sensor values. Attributes such as test or assay type, different sensor readings, whether a test was completed successfully, and warnings as well as errors during a test or self-test before the actual test may be used. Examples of input sources other than log files include, without limitation, files or databases that may store other details such as test start time, duration, and test result. These sources also store sensor readings for operating conditions such as ambient or device temperature, pressure, and humidity.

The patent application referenced in the paragraph immediately above discloses a signal finder program, which identifies the warning and errors that can be used as leading indicators of a part failure. In various embodiments, this signal identification algorithm is extended to use signals that are not limited to events in log files.

In various embodiments, one or more of the following techniques may be used to identify leading indicators of part failure:

Method 1:
1. Create a set S consisting of all the different types of sensors tracked, exam data, lab test or assay data, and different types of warnings and errors logged by a medical device.
2. Use set S to engineer the features required to train a machine learning model.

Method 2:
1. Create a set S consisting of all the different types of sensors tracked, exam data, lab test or assay data, and warnings as well as errors logged by a device in a time window of W days just before a part fails. That is if a part fails on date F, this window starts on date F-W and ends on F. W is configurable. It depends on multiple factors such as device type, part type, device manufacturer, part manufacturer, device model, part model, device usage, part usage, location, and environmental conditions.
2. Use set S to engineer the features required to train a machine learning model.

Figure 10A:
FIG. 10A illustrates time windows used to identify leading indicators of failure in an embodiment of a system to process and analyze data generated by a medical device.

Method 3 (see FIG. 10A):
1. Group the data from a device prior to part failure date into three windows, W1, W2 and W3. The length or size of each window is configurable. It depends on multiple factors such as device type, part type, device manufacturer, part manufacturer, device model, part model, etc.
   W1 is the period immediately before a part failed. It represents the period during which a part became unhealthy and started showing failure symptoms. W2 is the period immediately before W1. It represents the period during which a device part may have been in a healthy or unhealthy state, but the exact state is unknown. W3 is the period immediately before W2. It represents the period during which a device part was in a healthy or good state.
2. Create a set ES1 consisting of warnings and errors that occurred in W1.
3. Create a set ES3 consisting of warnings and errors that occurred in W3.
4. Create a set Sig1 consisting of warnings and errors present in ES1 but not in ES3.
5. Create a set Sig3 consisting of warnings and errors that are present in both ES1 and ES3 but have lower count in W3 than in W1.
6. Create a set S as a union of set Sig1 and Sig3
7. Use the warning and error events in set S, different tracked sensors, and exam data, lab test or assay data to engineer the features required to train a machine learning model.

In various embodiments, the task of predicting a part failure is transformed to a binary classification problem. Supervised machine learning techniques are applied on unstructured, semi-structured or multi-structured event logs, sensor readings, and assay data generated by medical or other devices, and other data from sources other than equipment logs, to train a classifier that is then used with new device data to predict whether a component will fail soon.

In some embodiments, a part failure prediction system as disclosed herein includes three software applications. The first application identifies the events, sensor readings, and assay data that can be used as the leading indicators of a part failure amongst the thousands of different types of events logged by a device along with other data. The second application groups data by device, part, and date; labels each group; engineers machine learning features from the leading indicators; and trains a binary classifier. The third application uses this binary classifier to offer a part failure prediction service. It takes new device data as input and predicts whether a component will fail soon. In various embodiments, machine learning models are trained for different components in different types of medical devices.

In various embodiments, the following terms may be used and refer to the definitions and examples that follow:

SPL (Semiotic Parsing Language). SPL is an ETL (Extract Transform Load) language used to describe complex log formats and how to parse them.

LCP (Loader/Compiler/Parser). LCP is a framework watching inputs (files, streams, emails), chooses an SPL and compiles it into memory, and parses event logs.

Actors and Actor Framework. Actors and Actor Framework revolve around actors, which in various embodiments are lightweight, immutable processes each with their own message queue (mailbox). Actors can only interact with the outside world by passing and receiving messages. Messages are queued in the actor's mailbox in the order received, and the next message will be processed only when the current message is completed. Actors are asynchronous and thread-safe.

Message Queue and Message. A message is the smallest unit of work sent to an actor. Mailboxes are message queues attached to each actor, which receive messages sent to the actor by other actors or other processes. Messages are processed one at a time by an actor, though many actors can process messages from their own mailboxes asynchronously.

FIG. 1 is a block diagram illustrating an embodiment of a system to process and analyze data from equipment logs and other sources. In the example shown, a set of machines represented in FIG. 1 by machine 102 and machine 104 are configured to send machine data and/or other data, such as sensor readings (122, 128) and assay data (124, 130), via the Internet 106 to log processing and analytics service 108. Log processing and analytics service 108 parses data receive from the machines (102, 104), extracts relevant data, and stores the data in database 110.

In the example shown, the data received from the machines (102, 104) may include data that relates directly or indirectly to component parts of the machines (102, 104). For example, machine 102 includes two parts (112, 114) and machine 104 includes three parts (116, 118, 120). In some embodiments, each machine (102, 104) is configured to generate and stream (or otherwise send) via the Internet 106 to data processing and analytics service 108 data associated with use of the machine (102, 104) and its component parts (or other subcomponents and/or sub-systems). For example, machine 102 may be a medical diagnostic, laboratory testing, or treatment equipment. Each of the machine 102 and the parts (112, 114) may generate event logs, sensor readings (124, 130), and/or assay data (122, 128).

In the example shown, assay data 122 and/or sensor readings 124 may be associated with specific instances of use of the machine 102, e.g., information about patient exams, tests, assays, or studies run on a medical device, such as machine 102, as well as readings for different sensor values, such as ambient or machine temperature, humidity, etc. . . .

In various embodiments, data processing and analytics service 108 is configured, as disclosed herein, to receive data from various machines (102, 104), e.g., machines of different types, manufacturer, etc.; extract relevant data values; and store the extracted values in database 110. In some embodiments, search and/or analytics tools are provided to enable device data to be searched and/or analyzed. In various embodiments, data processing and analytics service 108 is configured to receive and/or obtain files or other sources of data other than equipment data.

In various embodiments, data processing and analytics service 108 is configured, as disclosed herein, to provide a part failure prediction service. In some embodiments, the part failure prediction service is provided at another node or system having access to database 110, such as a dedicated remote server. In various embodiments, machine learning algorithms are applied to historical device data in database 110 to train a part (or component) failure prediction model, which is then applied to current data from machines to predict (possible) part failure.

In various embodiments, device data may be processed asynchronously and in parallel. In some embodiments, a framework disclosed herein is used to compile, asynchronously and if needed on demand, domain-specific language-based descriptions of complex log or other data formats and how to parse them to generate compiled parsers that are stored in memory and which use an executable class plus actor structure to parse arbitrary machine data asynchronously. In various embodiments, the framework may be implemented as a system, process, and/or embodied in a tangible, non-transitory computer readable storage medium, e.g., as a set of computer instructions to implement the framework.

In various embodiments, the framework may operate based on descriptions, expressed in a domain-specific language, of the format and/or content of logs generated by one or more systems. In some embodiments, SPL (Semiotic Parsing Language), an ETL (Extract Transform Load) language developed by Glassbeam, Inc., may be used to describe complex log formats and how to parse them. In some embodiments, a DSL and/or architecture as described in U.S. Pat. No. 9,830,368, the entire content of which is incorporated herein by reference as if fully set forth herein, such as the Semiotic Parsing Language (SPL) developed by Glassbeam, Inc., may be used.

In various embodiments, an LCP (Loader/Compiler/Parser) watches inputs (files, streams, emails), chooses a corresponding and/or otherwise suitable SPL (or other parser definition) program, and compiles the SPL into memory. In some embodiments, a context logic and/or module may determine a parser to be used to parse set of device data, e.g., a given file, bundle, stream, etc. The context module may use data included in the device data to determine which parser to use. For example, the context module may extract a part address, communication port, or other information from the device data, and map the extracted information to a serial number or other metadata, which in turn may be mapped to a parser definition of a parser to be used to parse the set of device data.

In various embodiments, Functional Programming concepts found in Scala, such as actors, maps, etc., as well as programming concepts such as threads, parallel (SMP) processing and containers, are used to provide and describe an asynchronous compiler as disclosed herein. In various embodiments, software in the Scala programming language running in the Akka framework is used to support a high level of actor-based concurrency. In various embodiments, fault tolerance is provided using this combination, or similar languages and concurrency models in a manner that enables high volumes of device data to be processed with minimal disruption. For example, if a chunk of device data is not able to be processed by a given actor, only that actor is interrupted. The actor may perform exception processing and be reset to be able to resume processing where it left off, all while other actors continue their respective work on other portions of the set of device data.

In some embodiments, a multi-tenant data processing (e.g., LCP) system is provided. In various embodiments, the LCP is able to handle an arbitrary number of parser programs (SPL) and execute them in parallel.

In various embodiments, the LCP receives files, compiles the SPL (or other parser description) on-demand (unless already compiled & cached). In various embodiments, the machine data processing system starts to parse the content even before compilation of the parser is complete (in various embodiments by employing a queuing mechanism and message bus, as disclosed herein). The resulting parsed data may be fed, asynchronously, to data stores (e.g., Cassandra, Solr, etc.), in some embodiments via a data abstraction object configured to translate parsed machine data into a form required to store the data in the target data store.

Figure 2:
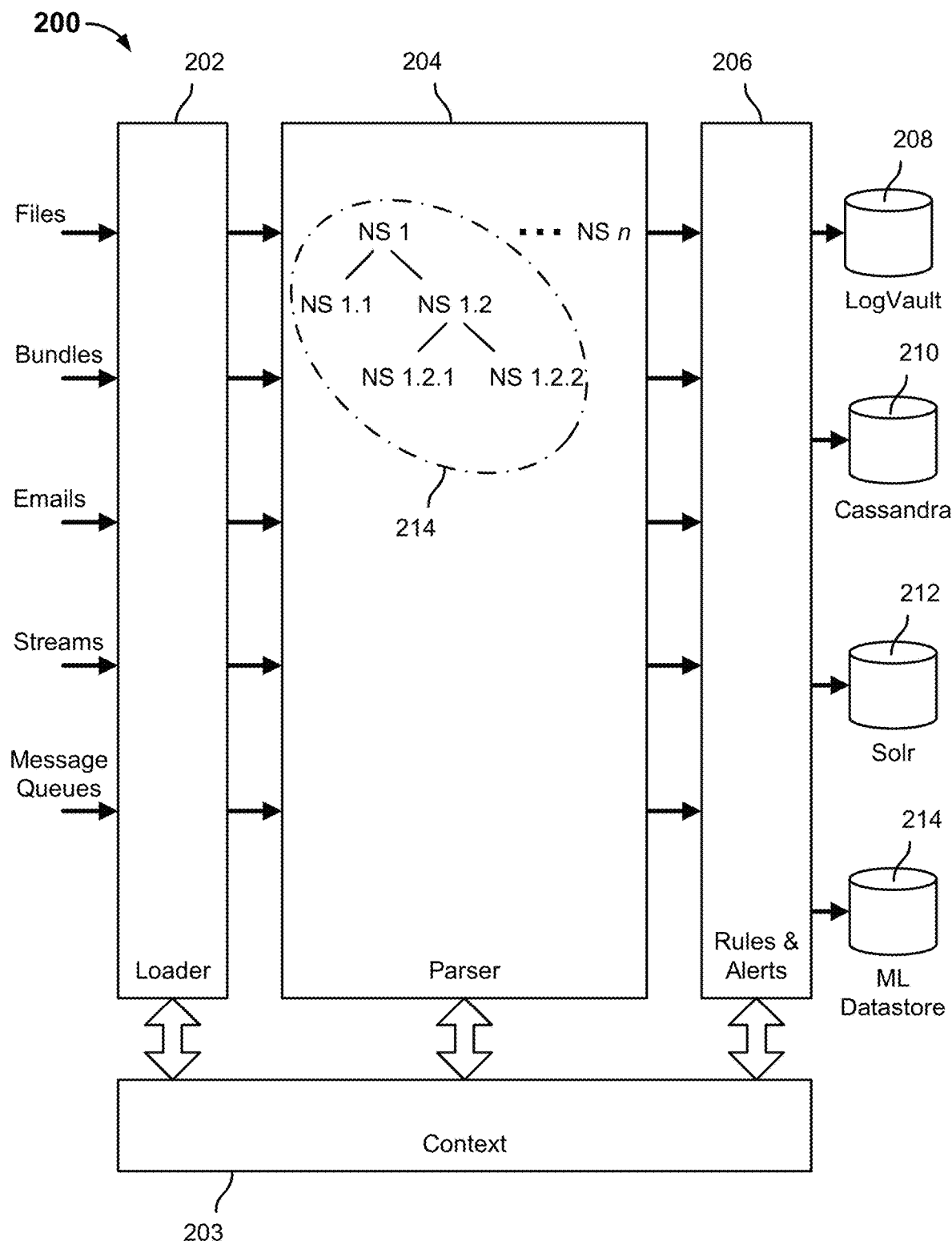
FIG. 2 is a block diagram illustrating an embodiment of a system to process and store machine data asynchronously.

FIG. 2 is a block diagram illustrating an embodiment of a system to process and store machine data asynchronously. In the example shown, the loader/compiler/parser (LCP) system 200 includes a loader component 202, a context module 203, a parser component 204, a rules and alerts component 206, and a plurality of data stores, including in this example a LogVault data store 208 (e.g., to store raw machine data), a Cassandra database 210 (e.g., to store and process parsed machine data, such as to facilitate analysis, reporting, etc.), a Solr data store 212 (e.g., to provide full text search capability), and a machine learning (ML) data store 214 (e.g., to store feature engineered and labeled device data, as disclosed herein).

In various embodiments, each of the loader 202, the parser 204, and the rules/alerts 206 may include a plurality of "actor" entities, each of which is capable of acting independently of and in parallel with other actors comprising the system to load, parse, analyze (e.g. apply rules, generate alerts), and store device data from multiple sources and potentially in diverse forms (e.g., files, streams, etc.) asynchronously and in parallel. In various embodiments, a message bus infrastructure is provided to enable events and other messages to be transmitted between actors comprising the system 200. An actor may have an event or other queue in which device data and/or other data (e.g., messages, events) received via a message bus from other actors may be staged. Each actor may pull data from its queue to be processed.

In some embodiments, data not yet ready to be processed may be left in the queue until the condition(s) required to process the data is/are met. For example, in some embodiments, as described more fully below, parsing of a set of device data (e.g., a file, stream, etc.) may start before the system has finished compiling the parser. For example, a parser may have a hierarchical structure and may comprise one or more actors at each node in the hierarchy. The parser may be able to begin parsing certain device data, associated with nodes for which compilation of the required parsing elements (e.g., actors) has been completed, even while other data remains held in a queue of the parser, waiting for compilation of parser elements associated with a subtree and/or node with which the other machine data is associated to be completed.

In various embodiments, data from numerous and varied sources, and in various forms, may be received concurrently. For example, in the example shown in FIG. 2, device data is shown as being received (potentially) in the form of files, bundles, emails, data streams, and message queues. In various embodiments, each set of machine data is received and processed by one or more actors comprising loader 202. In various embodiments, context module 203 instantiates and/or configures actors comprising loader 202 to refine and/or augment device data by associating context data with received device data. For example, device data may arrive that is identified by a manufacturer's serial number. In some embodiments, the serial number may be used by context 203 to look up other information, such as a manufacturer name, product name, and/or schema (if multiple versions of machine data structure may exist for the same product). In some embodiments, a data triplet comprising the manufacturer, product, and schema (M/P/S) may be used to characterize and process device data. For example, a parser definition to be used to parse the device data may be determined based on the M/P/S determined to be associated with a received set of device data. In some embodiments, the M/P/S triplet may be used as and/or to generate a key to be used to store data. In some embodiments, the M/P/S triplet or similar data may be used to ensure device data remains segregated in a multi-tenant environment, e.g., one in which multiple different system owners and/or users contract with the same multi-tenant instance of an LCP system such as system 200 of FIG. 2 to process device data from their respective installed product base. In various embodiments, the context 203 may provide the M/P/S or other identifying designation to the loader 202, parser 204, rules and alerts 206, and/or databases such as 208, 210, and 212, to ensure data remains segregated by manufacturer, end user, etc. While in some embodiments an M/P/S triplet may be used to identify and segregate data, e.g., by domain, owner, or otherwise, in various embodiments one or more other sets of data may be used, such as manufacturer/reseller (channel, etc.)/product, etc.

Referring further to FIG. 2, the parser 204 in various embodiments may include one or more instances of each of one or more different hierarchically-structured parsers. In some embodiments, a parser instance is created by compiling a corresponding parser definition that describes the content and structure of a set of data with which the parser definition is associated and how to parse instances of the data. In some embodiments, each parser may be associated with a top level "namespace" in the hierarchy. The namespace may correspond to and/or be associated with the manufacturer/product/schema triplet described above. In the example shown in FIG. 2, the parser 204 includes n parser instances, represented in FIG. 2 by top level namespaces "NS 1" and "NS n". In the example shown, the top level namespace "NS 1" is associated with a hierarchically structured parser 214, which includes multiple levels of hierarchy, each including zero or more child namespaces. For example, the top level namespace NS 1 includes child namespaces NS 1.1 and NS 1.2, and the latter in turn includes two child namespaces NS 1.2.1 and NS 1.2.2. In some embodiments, namespaces below the top level may correspond to different sections within a set of device data (e.g., a given file).

Each namespace in the hierarchy may be associated with one or more namespace "actors", each of which may be configured to perform such processing tasks as parsing and providing output data based on device data associated with the section (or other portion) with which that namespace is associated, and compiling the definition of the tables and/or child namespaces of that namespace. In some embodiments, each child namespace may represent a sub-section of device data. For example, the parser definition may define one or more tables within a namespace, and for each table may define one or more columns, column operations, other table functions, etc. In some embodiments, a namespace actor may be configured to compile definition statements associated with the namespace, e.g., to generate table structure information (e.g., schema), create table actors to process associated device data, and create child namespaces (if any), including associated actors. In some embodiments, a parser definition may indicate for each of at least a subset of table elements a corresponding type of parser to be used to parse associated data. For example, if a sub-section of device data with which a table is associated comprises free text, a line-by-line parser may be used. If instead the subsection included XML data, a parser optimized to parse XML may be used. Other examples include parsers optimized to parse name-value pairs, JSON, CSV, or other types of format of device data. In various embodiments, creating an actor may include creating data structures, such a queue in which to stage events or other messages received by the actor, and one or more message buses to be used to send messages to other actors in the system.

In various embodiments, actors are used in loader 202 to receive sets of device data, instantiate parsers, and stream machine data (e.g., line by line, in case of machine data received other than as a stream) to corresponding parsers. In some embodiments, loader 202 and parser 204 are configured to load and parse device data, as disclosed herein, e.g., to identify and extract features and create labeled datasets to be used to create and apply part failure prediction models as disclosed herein.

In various embodiments, complex software, hardware, and/or combined system may comprise many components, one or more of which may have multiple instances. In some systems, each component (instance) could be working independently within the whole system thus having its own time-ordered sequence of log events. Though such systems may have a hierarchy in the way they are built, the logging itself may not be hierarchical-because multiple components may be working in parallel at any given point of time. In such systems logging is separated out for each component (instance). The system as a whole ends up having multiple log files/streams.

In various embodiments, a parsing platform, such as parser 202, is built using the Scala programming language and the Akka actor framework. Scala and Akka are a very powerful toolkit to build fast data platforms which use multiple threads and CPU cores very efficiently. Techniques disclosed herein are implemented using multiple actors. Each actor does a small chunk of work and sends a message to the next actor in the pipeline. Akka allows having 'n' instances of any particular type of actor—this capability along with actors leads to fast concurrent parsing.

In various embodiments, an architecture and environment as shown in FIGS. 1 and 2 is used to extract and store machine data to create and/or apply a part failure prediction model as disclosed herein. However, in various other embodiments, other techniques may be used to obtain an at least partially structured set of log, exam, assay, sensor, service, and other device data to be used to train and/or apply a part failure prediction model as disclosed herein.

Installed equipment may play a crucial role in an industry. For example, in the medical field, medical diagnostic devices, such as X-ray, Computed Tomography (CT), Ultrasound, and Magnetic Resonance Imaging (MRI) devices, allow health care providers to see inside the body of their patients and help determine the root cause of their symptoms. Similarly, laboratory tests can provide information into the functioning of different organs, help identify diseases, detect risk factors, or detect infections in the body. Thus, they enable healthcare providers to develop the right treatment plan for their patients.

However, these medical devices (and other equipment) are not only expensive but also have parts that fail multiple times during the lifespan of a device. Generally, a replacement part is ordered when a part fails. However, it may take up to a few days for a replacement part to arrive. Until then that device cannot be used. Thus, an expensive asset stays unutilized because of an unplanned downtime. Alternatively, critical parts are replaced on a predetermined maintenance schedule. While this approach reduces unplanned downtime, it does not eliminate unplanned downtime since a part can fail between scheduled maintenance visits. In addition, it causes waste since a non-problematic part will also be replaced at a predetermined schedule.

In various embodiments, data processing and machine learning techniques disclosed herein are used to proactively determine when a part needs to be replaced. Machine learning techniques are applied on unstructured, semi-structured or multi-structured data generated by a medical device (or other equipment) to predict whether one of its components will fail soon.

Generally, device data is used for troubleshooting a device if there is a problem or the device does not function correctly. An event log file contains device and runtime information deemed important by a developer of the software running on it. In most cases, event logs are saved in a text file in a human-readable format. Each event log has a descriptive text describing an event or providing some information and is tagged with a severity, date/time stamp and source of the event. The severity of an event indicates whether it contains debugging, informational, warning or error information. The event description is generally unstructured or free-flowing text. A device may log hundreds, thousands, or even millions of events every day. In addition, a device may capture and store different types of sensor readings while it is operational. These readings may be captured at different frequencies ranging from once during an exam or assay to one per millisecond. Similarly, it may store detailed information about all the exams or lab tests.

In various embodiments, a subset of these events, sensor readings, exam or assay data, and service history is used to train a predictive machine learning model. Specifically, error and warning events logged by a device are used to identify leading indicators of a part failure and engineer machine learning features. In addition, for some types of devices, leading indicators are also present in the exam or assay data. Some types of devices track and save different sensor readings both before and during an exam or lab test. For these types of devices, the sensor readings are used to compute additional leading indicators of a part failure. If available, data from device service history is also used. This data is labeled programmatically to indicate whether it represents a device that will experience part failure soon. A labeled structured dataset is generated from unlabeled unstructured, semi-structured or multi-structured data. This dataset is then used with supervised machine learning algorithms to fit or train models. The best model is used for predicting whether a part will fail soon based on the current or most recent data generated by a device. The disclosed approach is used, in various embodiments, to predict failure of any part in any type of medical devices (or other equipment) from any device manufacturer.

Figure 8:
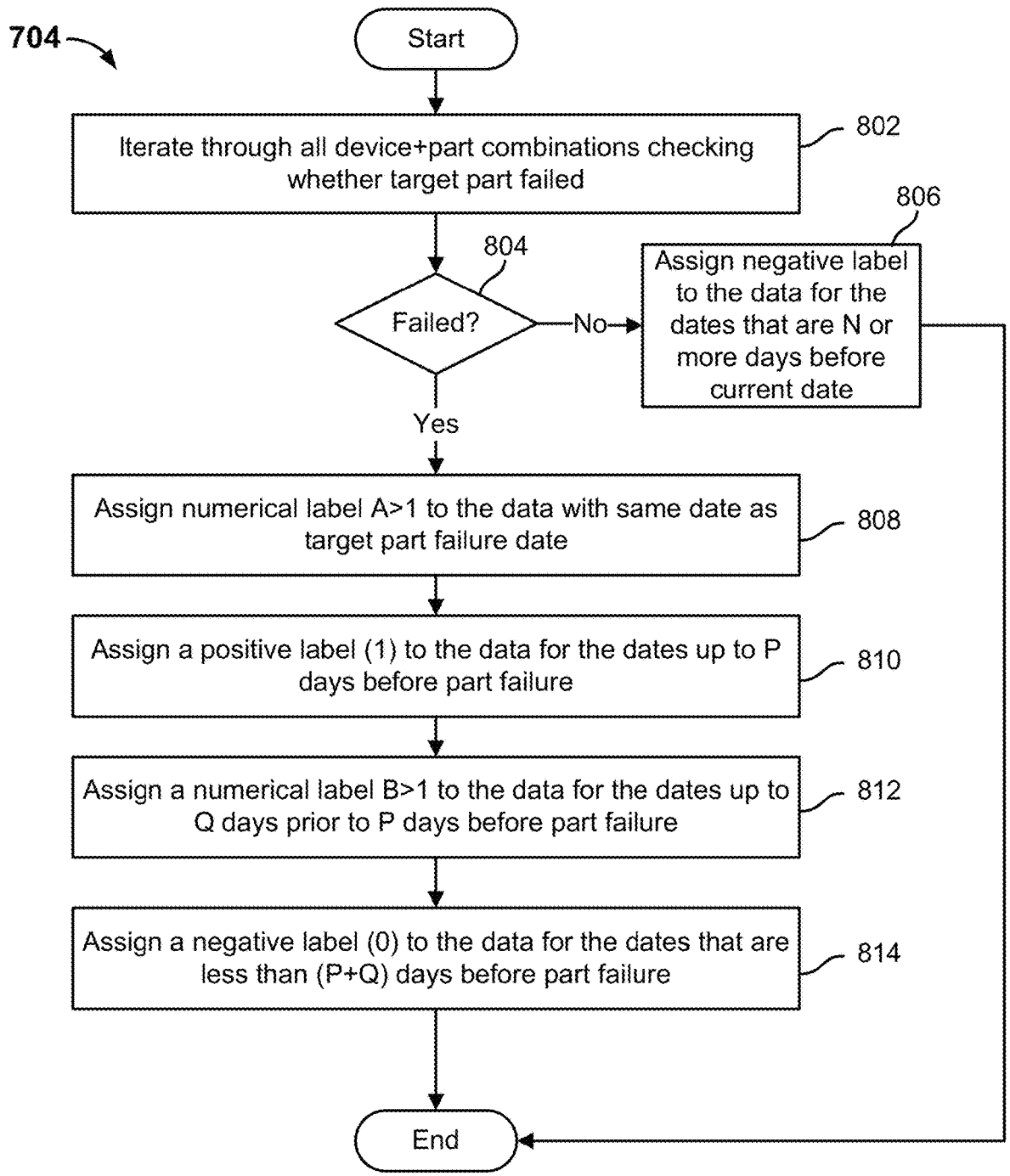
FIG. 8 is a flow chart illustrating an embodiment of a process to label event groups comprising machine data.

In some embodiments, by way of example, the failure of an X-ray tube in a CT scan machine is predicted. The steps for training and using a model that predicts tube failures are as follows, in some embodiments:

1) Collect historical data for several CT scanners. This data may include logs, sensors readings, exam data, system details, tube details, usage data and/or service history for CT scanners whose x-ray tubes stopped functioning correctly and had to be replaced.
2) Parse the unstructured, semi-structured or multi-structured data into a structured dataset.
3) Extract or infer failure dates for X-Ray tubes from the logs or import from an external system such as a CMMS (Computerized maintenance management system) or some other system used to provide maintenance support for these devices.
4) Identify the unique event types from the corpus of all events and map free-flowing event descriptions to unique event types. A log file containing millions of events may have only a few hundred different event types. The same event may be logged multiple times with different timestamps. Similarly, an event may be logged several times with different dynamic runtime parameters. Thus, the same source code line generates many variants of the same event at run-time. Even though these events do not have identical description text, they have the same static part of the event description. They all belong to the same event type.
5) Filter the warning and error events.
6) Identify the event types that can be used as leading indicators of an X-Ray tube failure (see, e.g., FIG. 6). These event types represent symptoms of an unhealthy X-Ray.
7) Create a state representation of a CT scanner for each day it was used. This will result in the creation of a collection of state representations. For example, if data is collected for sixty days for each of hundred CT scanners, this step will create 6000 state representations. The state representation of a CT scanner on a given date includes the following:

a. Count of each leading indicator event type logged by a CT scanner on that date.
b. Exam related statistics for that date. For example, total exams, incomplete, aborted, or failed exams, exams with part-specific warnings or errors, time interval between part-specific warnings or errors, exams after tube warmup, etc.
c. Summary statistics that capture important details for the different sensor readings for that date. For example, minimum, maximum, average, standard deviation, average rate of change, standard deviation of rate of change, average time between two consecutive peaks, standard deviation of the time between two consecutive peaks, average time between two consecutive troughs, standard deviation of the time between two consecutive troughs.
d. System details as of that date. For example, device model, age, etc.
e. Part details as of that date. For example, part model, part manufacturer, age, etc.
f. Servicing details as of that date. For example, time and count of exams since last preventative maintenance (PM) service, time and count of exams since last non-PM service, time and count of exams since last reboot, etc.
8) Store these device state representations in a table, where each row represents the state of a CT scanner on a specific date. The combination of CT scanner unique identifier (device id) and date forms the primary key in this logical table.
9) Generate features for machine learning by performing aggregation operations such as SUM, AVERAGE, STANDARD DEVIATION, MAX, MIN, etc., on each numerical column in this table over a sliding window of configurable duration. For example, this window could be 3, 7, 14, 21 or 28 days. The window duration is based in some embodiments on how many days prior to complete breakdown of an X-Ray tube, a scanner starts logging symptoms of an unhealthy X-Ray tube. The sliding window advances by one day at a time over rows ordered by date. Optionally, generate additional features by performing aggregations operations on the same columns over sliding sub-windows of configurable duration within each window. For example, after computing features over a 7-day window, additional features may be computed over sub-windows of length 1 and 3 days. The features corresponding to the 7-day window capture summary statistics over a 7-day period. The features corresponding to the 1-day sub-window capture summary statistics for each day within this 7-day period. Similarly, the features corresponding to the 3-day sub-window capture summary statistics for all 3-day subperiods within the 7-day window.
10) Label each row (e.g., as illustrated in FIG. 8). A row with a positive label represents a scanner with an X-Ray tube that will fail soon. Negative label represents a scanner whose X-Ray tube will not fail soon.
11) Split the labeled dataset into a k-folds of training dataset and test dataset, where k can range from 1 to number of devices in the dataset.
12) Using the features and labels generated in previous steps, train and evaluate machine learning models using all the k-folds of training and test dataset using different machine learning algorithms available for training a binary classifier. For example, in some embodiments models are trained with one or more of Random Forest, Gradient Boosted Trees, Deep Neural Networks, etc. Find optimal hyper-parameters for each ML algorithm using cross-validation. Additionally, experiment with different combinations of features to find the set of features that train a model with best performance metrics.
13) Evaluate the ML models trained in previous step by computing the average value of the different model performance metrics for the test datasets across all the k folds. Performance metrics used for evaluation include accuracy, recall, precision, specificity, F1-score, AuROC, etc. . . .
14) Select the model giving the best performance.
15) Evaluate the best model's performance against business requirements or the minimum performance metrics that need to be met for a model to be eligible for deployment.
16) Train an ML model with the entire dataset using the algorithm, features, and hyper-parameters that gave best results.
17) Deploy or operationalize this ML model using a data pipeline implemented for ML scoring or inference. The model takes as input daily data generated by a CT scanner and returns a prediction whether its X-Ray tube will fail soon.
18) Continue to update ML model periodically by updating the features set and adding more positive samples to the training dataset.

While the above example refers to use of techniques disclosed herein to predict failure of an X-Ray tube in a CT scanner, in various embodiments techniques disclosed herein are used to train a failure prediction model for other parts in a CT scanner or from other types of medical devices or other equipment and to use the model to predict part failure before failure occurs.

Figure 3:
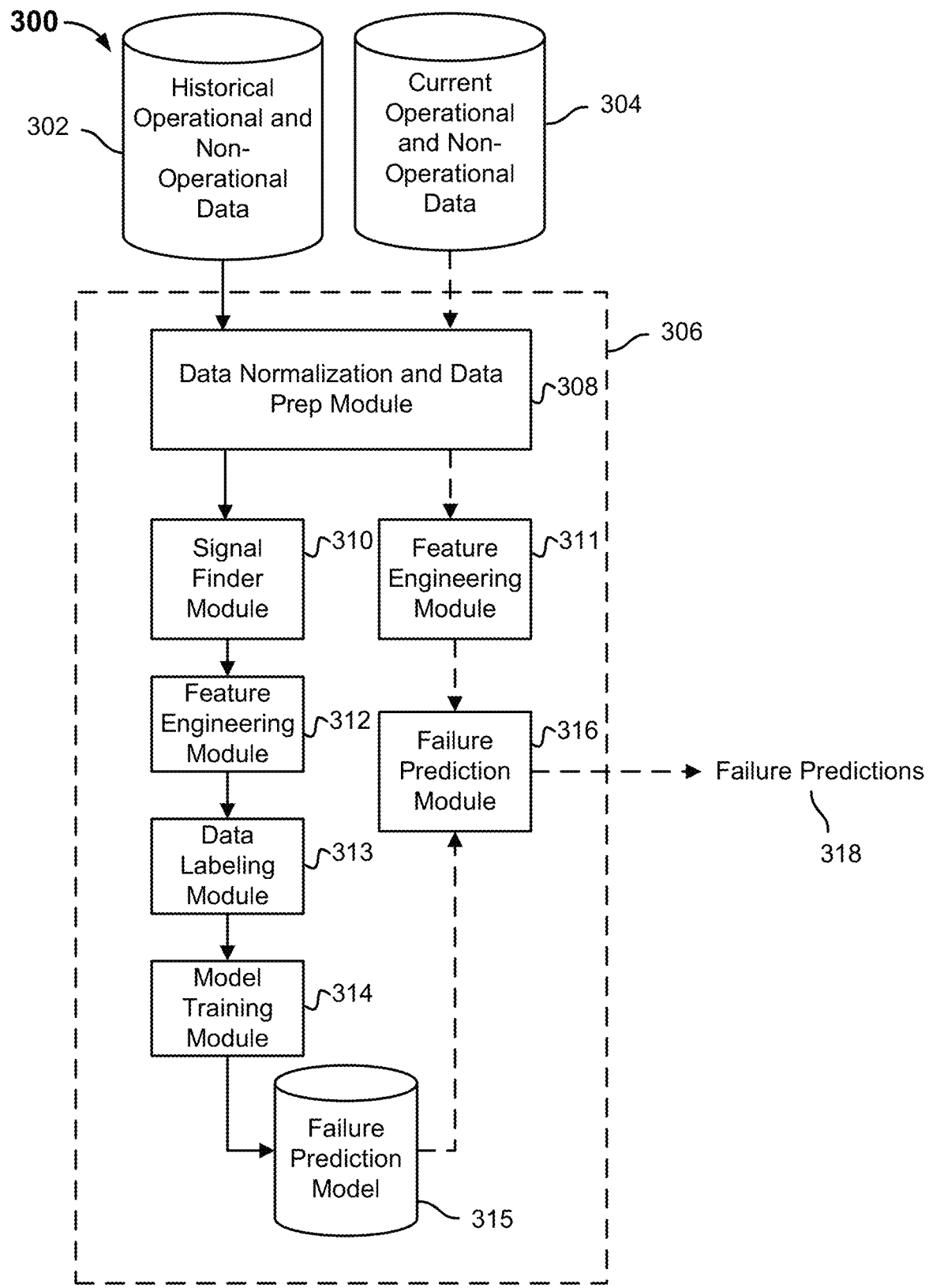
FIG. 3 is a block diagram illustrating an embodiment of a failure prediction system.

FIG. 3 is a block diagram illustrating an embodiment of a failure prediction system. In the example shown, system 300 includes a failure prediction server, system, and/or service 306 that receives training data 302 comprising historical operational (e.g., log) and non-operational device data associated with instances of a given machine, device, etc. within a population of related machines, devices, etc., such as a CT scanner or other medical equipment of a given make and model, along with part replacement data for at least a subset of the machines, etc., in which a given part for which a failure prediction model is to be generated has failed and been replaced.

In addition, failure prediction server, system, and/or service 306 is configured to receive current operational and non-operational device data 304 from machines, devices, etc. comprising the population and/or a related set of machines, devices, etc., such as another population of machines of the same make and model. In various embodiments, failure prediction server, system, and/or service 306 is configured to use a part failure prediction model it generated based on training data 302 to predict based on current device data 304 whether the part for which the part failure prediction model was generated is predicted to fail in a given instance of the machine, device, etc., e.g., within a prediction period or window. In various embodiments, part failure predictions may be used to proactively order replacement part and/or optionally schedule replacement service prior to failure.

In the example shown, failure prediction server, system, and/or service 306 includes a data normalization and data prep module 308. In this example, historical device data received as training data 302 or current device data 304 is normalized and pre-processed to train and/or apply a part failure prediction model as disclosed herein. In some embodiments, for example, device data is normalized to a format not specific to any machine, make, or model, enabling the failure prediction server, system, and/or service 306 to be used to train and/or apply a part failure prediction model for any part of any machine, device, etc., regardless of type, make, or model. In various embodiments, the data normalization and data prep module 308 receives device data as stored in a structured database and generates a filtered set of structured event machine data to be used to train and/or apply a part failure prediction model as disclosed herein.

In the model generation (training) phase, in various embodiments, data normalization and data prep module 308 extracts or otherwise receives and/or determines part failure and/or replacement dates for the part for which a failure prediction model is being generated.

In the model generation (training) phase, in various embodiments, the signal finder module 310 analyzes device data to identify a filtered set of events that occurred (or not) in prescribed windows before and after part replacement. Events potentially predictive of part failure are identified as signals or leading indicators of part failure. Features used by machine learning algorithms to train a model are engineered from these signals.

Failure prediction server, system, and/or service 306 further includes a feature engineering module 312 that engineers features from the events associated with the event types identified as potentially predictive of part failure. A data labeling module 313 organizes and labels the device data and model training module 314 applies multiple different machine learning algorithms to the labeled dataset to train a failure prediction model 315 for a part. In the failure prediction phase, the feature engineering module 311 generates features from the current device data and provides the features as input data to the failure prediction module 316, which uses the feature data and failure prediction model 315 to determine whether the part is predicted to fail in a given instance of the machine, device, etc., based on the feature data for that instance and the failure prediction model 315. If a failure is predicted 318, one or more configured actions are taken—e.g., an alert or other notification—is generated and sent, e.g., to an administrator, to a system or module configured to automatically start a workflow to proactively order a replacement and optionally schedule a technician to replace the malfunctioning part, etc.

Figure 4:
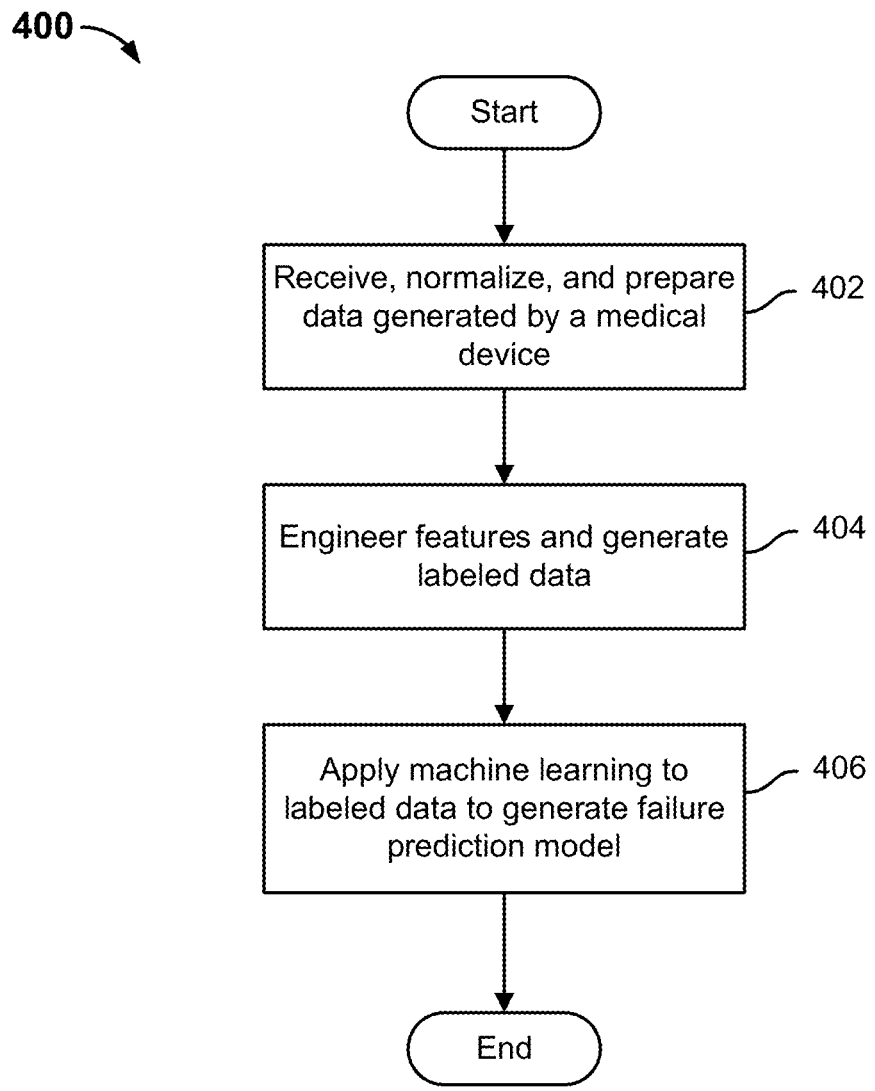
FIG. 4 is a flow chart illustrating an embodiment of a process to predict failure based on machine data.

FIG. 4 is a flow chart illustrating an embodiment of a process to predict failure based on current device data. In various embodiments, the process 400 of FIG. 4 is implemented by one or more computers, such as one or more servers configured to provide a part failure prediction service as disclosed herein. For example, in some embodiments, the process 400 of FIG. 4 is implemented in whole or in part by a log processing and analytics service, such as log parsing and analytics service 108 of FIG. 1.

In the example shown, at 402 device data is received, normalized, and prepared to determine and store a subset of device data, e.g., a subset of logged events, sensor readings, and/or assay data, to be used to generate (train) a part failure prediction model. At 404, data comprising a set of "features" to which machine learning algorithms are to be applied to generate a part failure prediction model are engineered and labeled. At 406, machine learning algorithms are used to generate a part failure prediction model based on the datasets extracted and labeled at 404. In various embodiments, a plurality of machine learning algorithms including two or more different types of machine learning algorithm are applied each to a training subset of the labeled data to generate a corresponding model. The models are then tested using a test subset of the labeled data and a "best" model is selected, e.g., one that best predicts failures among the test subset of machines/devices.

Figure 5:
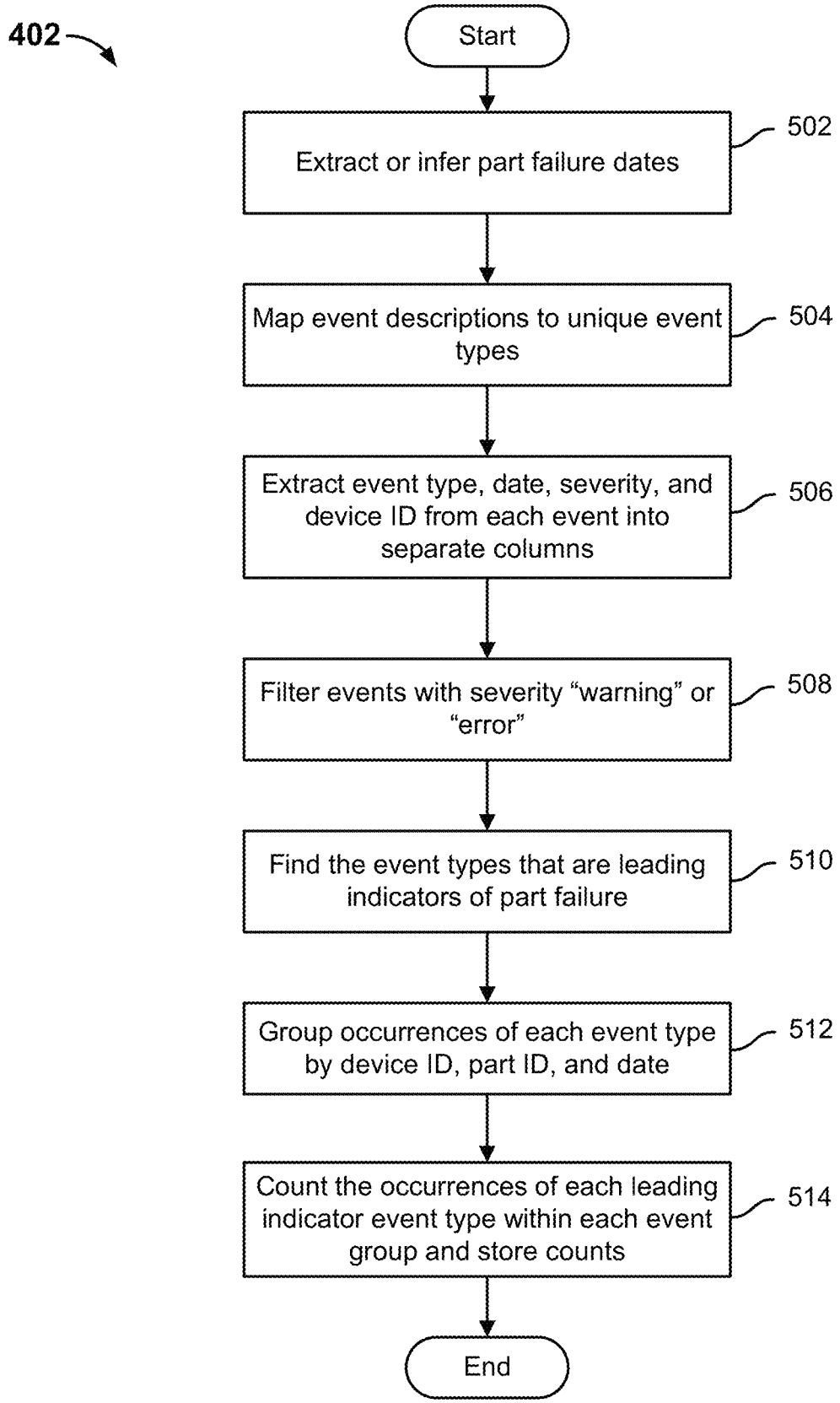
FIG. 5 is a flow chart illustrating an embodiment of a process to receive, normalize, and pre-process machine data.
Figure 6:
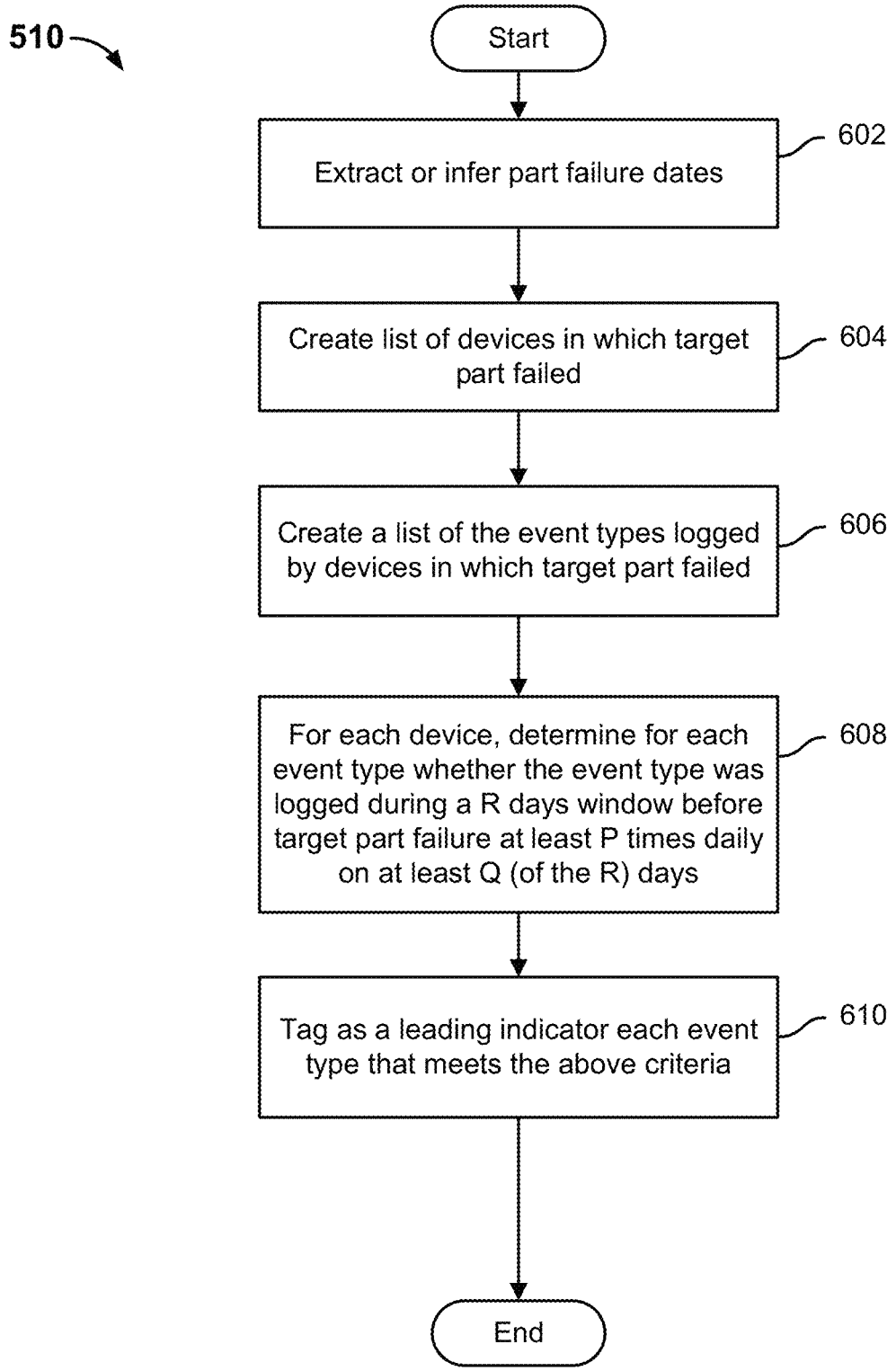
FIG. 6 is a flow chart illustrating an embodiment of a process to identify a subset of logged event types as leading indicators of failure.

FIG. 5 is a flow chart illustrating an embodiment of a process to receive, normalize, and prepare device data. In various embodiments, step 402 of FIG. 4 is implemented at least in part by the process of FIG. 5. In the example shown, at 502, part failure data is extracted or inferred from received device data. At 504, event descriptions are mapped to unique event types. For example, events of the same type may share common content but not be entirely identical, e.g., due to non-static info included in the event description such as temperature, etc. At 506, event type, date, severity (e.g., warning, error, etc.) and unique device identifier information is extracted from each logged event and stored in separate columns. In some embodiments, a separate table or other data structure is created and used to store the values extracted at 506. Events with severity of "warning" or "error" are filtered at 508, to provide a subset of events having the prescribed severity or greater in this example. At 510, event types that are leading indicators of part failure are determined. In some embodiments, the process of FIG. 6 is used. In various embodiments, events that occur across many devices with at least a prescribed frequency of occurrence in a prescribed window (e.g., a certain number of days within a prescribed number of days before part replacement) and which occur less or not at all during a second window of prescribed number of days after part replacement may be identified as a leading indicator event type. At 512, occurrences of each event type are grouped by device identifier and date. At 514, the number of occurrences of each leading indicator event type within each event group (by device and date) are counted and stored.

In various embodiments, the process of FIG. 5 is implemented to filter and pre-process device data in preparation to engineer features and label datasets to be used to train and test a part failure prediction model as disclosed herein.

In various embodiments, once a part failure prediction model has been created at least in part based on application of the process of FIG. 5 to historical operational and non-operational device data, some of the steps of the process of FIG. 5 are performed on new or current device data, to prepare such data to be evaluated using the part failure prediction model to detect (possible) impending failures. For example, the steps other than step 502 and step 510 may be performed, since the features to be extracted would in some embodiments be the same ones determined at model generation time to be (potentially) predictive of part failure.

FIG. 6 is a flow chart illustrating an embodiment of a process to identify a subset of logged event types as leading indicators of failure. In various embodiments, the process of FIG. 6 is performed to implement step 510 of the process of FIG. 5. In the example shown, at 602, part failure dates are extracted or inferred from device data. At 604, a list of devices in which the targeted part—i.e., the part for which a part failure prediction model is currently being created—has failed is created. At 606, a list is created of event types logged by devices in which the part has failed. At 608, for each device, it is determined for each event type observed (at 606) in devices in which the part has failed whether the event type was logged during an R days window prior to the part failing with a frequency, distribution, etc. that satisfies a prescribed criteria, in this example the criteria being that the event type was logged at least P times daily on a least Q of the R days comprising the window. In various embodiments, the length of the window R, the start/end days prior to replacement for the window R, and the frequency/other criteria are determined based at least in part on machine data associated with devices in which the target part was replaced. At 610, each event type that meets the pre-replacement criteria (at 608) is tested against criteria for occurrence (logging) of the event type post-replacement. In this example, an event type is determined to be a "leading indicator" of part failure if the pre-replacement criteria tested at 608 are met and the event type had during X days following replacement an event count less than N % of its corresponding count during the R day window prior to replacement.

In various embodiments, the criteria applied at 608 and/or 610 may be adjusted and/or determined by domain experts and/or at least in part by reviewing machine data of at least a sample of devices in which the target part has been replaced. The criteria depend on the type, make, and model of a device as well as the type of the part for which a model is being trained. For example, some type of devices may start logging failure symptoms two weeks before a part needs to be replaced whereas another type of devices may start logging symptoms only a week before a part needs to be replaced. The criteria also depend on how quickly a part deteriorates after the onset of symptoms of a problem with that part.

Figure 7:
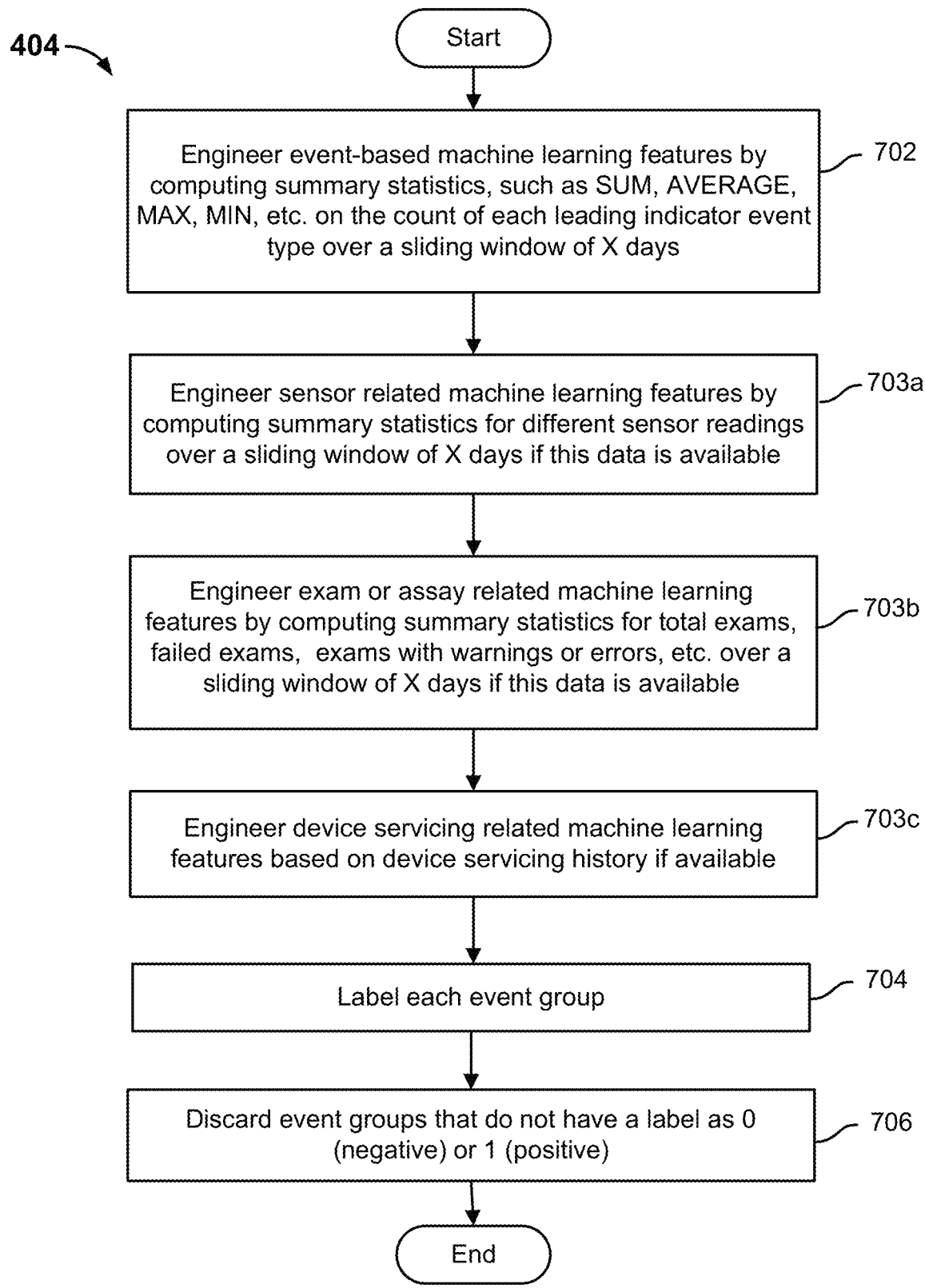
FIG. 7 is a flow chart illustrating an embodiment of a process to engineer features from and label machine data.

FIG. 7 is a flow chart illustrating an embodiment of a process to engineer features from and label machine data. In various embodiments, the process of FIG. 7 is used to implement step 404 for FIG. 4. In the example shown, at 702, machine learning features are engineered by performing aggregation operations, such as SUM, AVERAGE, MIN, MAX, etc., on the count of each leading indicator event type over a sliding window of X days for each device. At 703a, sensor related machine learning features are engineered by computing summary statistics for different sensor readings over a sliding window of X days if this data is available. At 703b, exam or assay related machine learning features are engineered by computing summary statistics for total exams, failed exams, exams with warnings or errors, etc. over a sliding window of X days if this data is available. At 703c, device servicing related machine learning features are engineered based on device servicing history if available.

Each event group is labeled at 704. As described earlier, an event group represents the counts of different leading indicator event types logged by a device on a given day. In some embodiments, event groups are labeled as shown and described in connection with FIG. 8. At 706, event groups that do not have a label as 0 (negative) or 1 (positive) are discarded.

In various embodiments, the processes of FIGS. 5, 6 and 7 enable device data from a variety of different devices, e.g., different manufacturers, different types of device, different make, model, build, etc., to be processed as disclosed herein using a shared framework not specific to any one device. For each device type, device data is processed to programmatically identify unique event types, map events descriptions to unique event types, identify the event types associated with predicting failure (leading indicator event types), group events into event groups (e.g., one group) per device identifier and date, label the event groups, and filter and aggregate device data to focus on a subset of data useful to predict failure. Data may be aggregated according to an aggregation rule, e.g., over a prescribed number of calendar days, a prescribed number of usage days, a prescribed number of occurrences, and a prescribed number of instances of use, etc.

In various embodiments, the aggregation operations are performed over a configurable time interval and include one or more of the following: Count, Minimum, Maximum, Average, Standard Deviation, Average Rate of Change, Standard Deviation of Rate of Change, Maximum Change, Minimum Change, Average time between consecutive peaks, Standard deviation of the time between consecutive peaks, Average time between consecutive troughs, Standard deviation of the time between consecutive troughs.

In various embodiments, unique event types are identified and logged events are aggregated and filtered programmatically without a priori knowledge of device attributes, log format or content, etc. Features are engineered programmatically to produce datasets usable to create without human intervention failure prediction models as disclosed herein, and to use such models to predict failure in devices (system) in which the target part (component) will need to be replaced within a prescribed prediction window.

FIG. 8 is a flow chart illustrating an embodiment of a process to label device data. In various embodiments, the process of FIG. 8 is performed to implement step 704 of FIG. 7. In the example shown, the process of FIG. 8 is performed iteratively through all applicable devices (device IDs), labeling event group and/or other device data for each device based on whether the target part failed in that device (802). If the part did not fail in the device (804), at 806 a negative label (0) is assigned to the data for the dates that are N or more days before current date. If the part failed in the device (804), the following steps are performed:

at 808, a numerical label A>1 is assigned to device data with the same date as target part failure date;

at 810, a positive label (1) is assigned to device data for dates up to P days before target part failure;

at 812, a numerical label B>1 is assigned to device data up to Q days prior to P days before target part failure; and at 814, assign a negative label (0) to device data for dates that are less (earlier) than (P+Q) days before part failure.

In various embodiments, the values A and B in the process of FIG. 8 are used to segment the device data into various categories comprising data that are not used. In some embodiments, data with label A or B are not used because of the uncertainty about the health of a device (or part) on certain dates. For example, data with label A may represent events that occurred after replacement or before replacement depending on whether a part was replacement at the beginning or end of day; data with label B may represent a buffer zone where one cannot be sure whether data from a device with either healthy or malfunctioning part; etc. Data with label C are not used in some embodiments because of how the algorithm works. Since features are generated by performing aggregation operations on the event counts over a window of prescribed duration, the event counts just before replacement date will affect the features generated for the dates immediately after a part replacement date.

In various embodiments, feature engineering as disclosed herein is applied to information other than and/or in addition to machine data to identify features to be used to train and use a machine learning model to predict part failure.

As described above, in various embodiments, different aggregation operators may be applied on the daily count of an event over a sliding or hopping window. In various embodiments, the aggregation window may be split into one or more sub-windows. Both the aggregation window length and number of sub-windows are configurable. The exact values for both variables depend on the device and part for which a part failure machine learning model is trained. For example, an aggregation window could span 3, 7, 14, 21, or 28 days. Similarly, an aggregation window of length N can be split into sub-windows ranging in length from 1 to N.

In various embodiments, the length of aggregation windows and sub-windows can be configured as calendar days or usage days. Usage days count only those days on which a part was used. A device may have multiple subsystems or parts of the same type so that it can be used to run multiple tests simultaneously. For example, a Molecular Diagnostic System can have 4, 8, 16, 32, 64 or 128 Modules but not all of them get used every day. A system may use a few Modules on a given day. The data for each individual Module is sparse. Therefore, aggregation window and sub-window length based on Module usage days is more suitable for training a part failure model in such cases.

In various embodiments, features that are not based on warning or error events may be engineered or otherwise identified. Such features are sometimes referred to herein as will be referred to as meta features. Examples of meta features include four groups of features: statistical, static, sensors, and service history-based features.

In various embodiments, statistical features capture usage, idle time, and frequency of warnings and errors both in absolute terms and as percentages. A few examples of such features include:
  Number of total tests, exams, studies, or procedures in a period
  Number of failed tests, exams, studies, or procedures in a period
  Percentage of failed tests, exams, studies, or procedures in a period
  Percentage of part-specific warning and errors in a period
  Time gap between different part-specific warning and errors
  Count of days a part was actively used in a period
  Percentage of same warning and errors occurring in multiple parts of the same type in the same system in the same period
  Percentage of same warning and errors occurring in multiple systems in the same period In various embodiments, static features capture part and device attributes or properties that do not change or rarely change over time. A few examples of such features include:
  Device model
  Device location
  Device installation date
  Part model
  Part installation data
  Part manufacturing date
  Part manufacturer
  Software version In various embodiments, one or more sensors monitor external or internal operating conditions. These sensors may capture ambient, device or part-specific data. A few examples include:
  Temperature
  Pressure
  Humidity Features are engineered from sensor values by applying different operators on the sensor values over a configurable time interval. A few examples of the operators are listed below:
  Count
  Minimum
  Maximum
  Average
  Standard deviation
  Average rate of change
  Standard deviation of rate of change
  Maximum change
  Minimum change
  Average time between two consecutive peaks
  Standard deviation of the time between two consecutive peaks
  Average time between two consecutive troughs
  Standard deviation of the time between two consecutive troughs In various embodiments, service-history based features are generated using data that tracks different types of servicing performed on a device or a part. Service history is generally maintained in a Computerized Maintenance Management System (CMMS) or Customer Relationship Management (CRM) system. Examples of service-related features include:
  Time since last preventative maintenance service
  Time since any type of service last performed
  Type of last service
  Components serviced or replaced during last service
  Frequency of preventative maintenance service As noted above, data must be labeled to facilitate machine learning. Data collected from a device is generally unlabeled, which limits the ML algorithms that can be used. For model training, data from at least 50 devices with a failed part for at least 90 days prior to failure is required. Each device may log 100 or more events per day. In addition, each device may track and save sensor readings for one or more sensors at different time intervals. The frequency at which these sensor readings are saved ranges from once per millisecond during a laboratory test, exam, or study to once per test, exam, or study. Labeling this volume of data manually is cumbersome and impractical. Therefore, an unlabeled dataset is converted into labeled datasets programmatically, using a software program to make it usable for supervised machine learning.

In various embodiments, the software program first organizes data by device, part, and date. For each date for which data is available for a part, features are engineered to create a row for a device, part, and date combination. A label is programmatically generated for each such row.

Second, the software labels data from both (1) devices with part failure and (2) those that have the same part in operational condition. Since it is unknown whether a part is about to fail or not, a buffer period is created for data from parts that have not yet failed. The length of this buffer period is configurable. Data from the buffer period is excluded from training and testing dataset. Data preceding the buffer zone is assigned negative label.

Third, labeling software generates both positive and negative samples using only data prior to part failure date. After a part fails, no data may be logged for that specific part after the failure date. In some embodiments, data is labeled in such cases using the following algorithm.

Figure 10B:
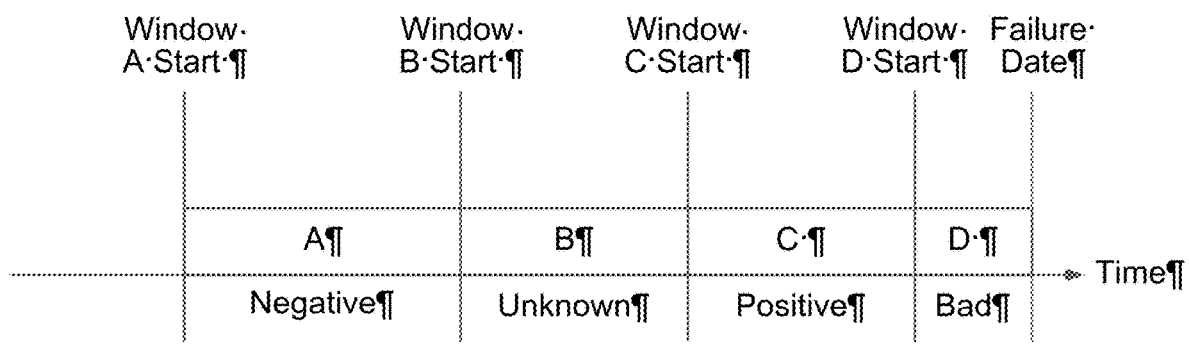
FIG. 10B illustrates labeling windows in an embodiment of a system to process and analyze data generated by a medical device.

Group the data from a device prior to and inclusive of part failure date into four windows, A, B, C and D, as illustrated in FIG. 10B. The length or size of each window is configurable. It depends on multiple factors such as device type, part type, device manufacturer, part manufacturer, device model, part model, etc.

Window D stretches backward from part failure date and includes zero or more dates prior to failure date. It represents the period during which a part was still functioning but already in a bad state or unhealthy. The length of this window will be zero if a part becomes unusable as soon as it goes into a bad or unhealthy state. Data from Window D is excluded from training and testing dataset.

Window C consists of the dates immediately before Window D starts. It represents the period during which a part showed symptoms of failure. Data for each date in Window C is labeled as positive.

Window B consists of the dates immediately before Window C starts. It represents the period during which a part may have been completely healthy or started showing symptoms of bad health, but the exact state is unknown. Data for all the dates in Window B is excluded from both training and test dataset.

Window A consists of the dates prior to the first date in window B. It represents the period during which a part was in a healthy state. Data for each date in Window A is labeled as negative.

The date on which a part failed is required for both finding the leading indicators of failure and programmatic labeling of unlabeled device data. In various embodiments, one or more of the following techniques may be used to extract or infer both the date on which a part failed and the date on which it was replaced.

In some devices, a failed part may be replaced a few days, weeks, or months after it has failed. In various embodiments, a distinction is made between the replacement and failure dates. Instead of using the part replacement date, a system as disclosed herein, in various embodiments, uses the failure date for both labeling data and finding leading indicators of failures. However, the exact date on which a part failed may not be available in many cases. One or more techniques disclosed herein may be used to infer this information.

For example, the date on which a part was replaced may be available in the logs, a CMMS system that tracks part replacements, or a database used for tracking service performed on a device. In some embodiments, the last date on which a part was used before replacement is treated as the date on which it failed.

When the part replacement date is not directly available, in some embodiments, it is inferred from data. For example, a change in part serial number may indicate that a part was replaced. Similarly, if one part was not used for an abnormally long period but the device used other parts of the same type during that time, it is inferred that specific part has failed. A configurable inactive period can be used in such cases to determine when a part failed.

Figure 9:
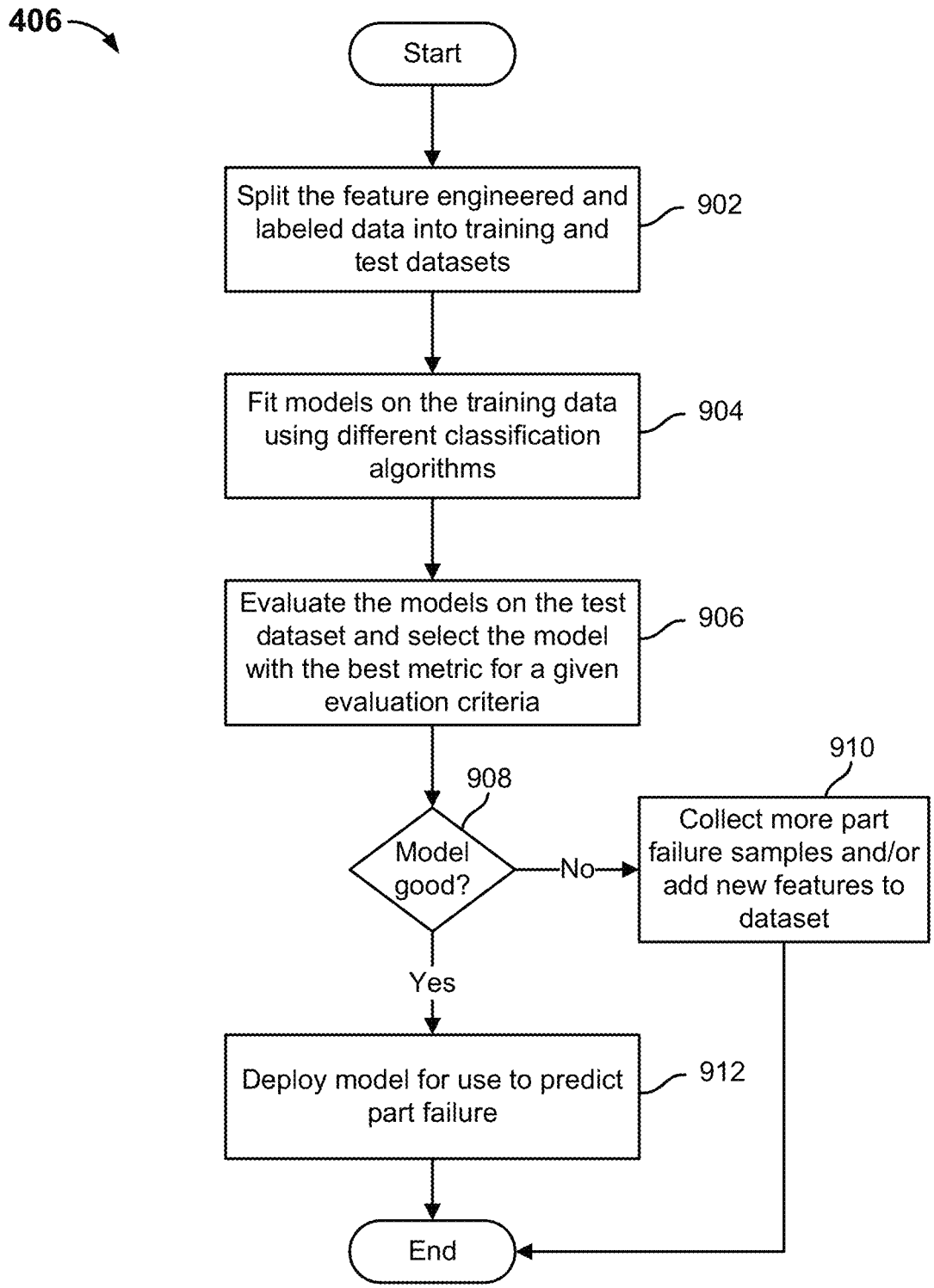
FIG. 9 is a flow chart illustrating an embodiment of a process to apply machine learning techniques to machine data to generate a failure prediction model.

FIG. 9 is a flow chart illustrating an embodiment of a process to apply machine learning techniques to machine data and other information to generate a failure prediction model. In various embodiments, the process of FIG. 9 is performed to implement step 406 of FIG. 4. In the example shown, at 902, the labeled dataset is split into training and test datasets. For example, the labeled data for one set of devices may be included in the training set and the labeled data for the remaining devices may be included in test dataset. The test dataset is used, in various embodiments, to test the various models generated by the respective machine learning algorithms to select a model having desired performance, e.g., highest recall or F1-score on the test dataset.

At 904, models are fitted on the training data using different classification (machine learning) algorithms. At 906, the resulting models are evaluated based on their performance on the test dataset and the model with the best metric for a given evaluation criteria is selected. If none of the models satisfies prescribed selection criteria (908), at 910 more part failure samples are obtained and/or additional features are added to the datasets and the process of FIG. 9 is performed again. If the model selected at 906 meets applicable criteria (908), at 912 the model is deployed for use to predict target part failure in devices based on their current data.

While in various embodiments described herein reference is made in some detail to generating and using a model to predict failure of a single target part in a single device and/or device type (e.g., machine, make, model), in various embodiments techniques disclosed herein are applied across tenants, customers, device type (machine, make, model), etc., and with respect to zero, one, or more parts for each device type, etc. For example, CT scanner X-Ray tube failure prediction models may be generated for a single customer's installed base of CT scanners of a given make and model. In some embodiments, CT scanner X-Ray tube failure prediction models may be generated for each of a plurality of CT scanner types (e.g., different makes and/or models), in some embodiments across multiple users/owners of the same make/model. In some embodiments, models are generated and used as disclosed herein to predict failure of parts other than and/or in addition to X-Ray tubes or similar parts. In some embodiments, models are generated and used as disclosed herein to predict failure of different types of parts in different types of medical devices such as medical diagnostic equipment, laboratory testing equipment, and others. Examples of medical diagnostic equipment include Magnetic Resonance Imaging (MRI) machine, Ultrasound machine, Defibrillator, EKG/ECG machine, Patient Monitor, Anesthesia machine, X-Ray machine, Digital mammography machine, nuclear medicine machine, etc. In some embodiments, ML models are trained and used as disclosed herein to predict failure of parts in laboratory testing systems such as Molecular Diagnostic Systems, Urine Analyzers, Immunoassay Analyzers, Hematology Analyzers, Chromatography Systems, etc. In some embodiments, techniques disclosed herein are used to predict failure of non-hardware components, such as software applications, modules, or components.

In various embodiments, techniques disclosed herein may be used to generate a failure prediction model for a target part (or component), and to use the model to predict failure and take proactive action (e.g., order replacement part, schedule a technician, and/or replace the part) prior to actual failure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communication interface configured to receive data associated with a plurality of devices, the plurality of devices comprising a population of devices of a same device type each having a same target part subject to failure and the data for each device comprising machine data comprising a hundred or more logged events per device per day and non-machine data, for ninety or more days and fifty or more devices; and
   a processor coupled to the communication interface and configured to:
   determine based on the received data, for each of at least a subset of the plurality of devices, a part failure date on which the target part failed in that device;
   create a dataset S comprising for each device in which the target part failed a set of one or both of errors and warnings logged in one or more windows W preceding the failure date on which the part failed combined with non-machine data associated with use of the device and part in the one or more windows W preceding the failure date;

use the dataset S to programmatically engineer a set of features usable to predict failure of the target part, the set of features including one or more features that are not based on logged warning or error events;

for each device in which the target part failed, programmatically labeling data associated with a first window of time prior to part failure as "positive" and labeling data associated with a second window of time prior to the first window of time as "negative";

for each device in which the target part has not failed, programmatically labeling data associated with a first window of time prior to a buffer period as "negative";

aggregating at least a subset of the labeled data according to an aggregation rule; and use the labeled and aggregated data to train a machine learning model configured to be used to predict failure of the target part in a device based on data from that device, including by computing from the data features corresponding to the programmatically engineered set of features.

2. The system of claim 1, wherein the aggregation rule prescribes aggregation over one or more of the following: a prescribed number of calendar days, a prescribed number of usage days, a prescribed number of exams, studies, lab tests, or procedures, a prescribed number of occurrences, and a prescribed number of instances of use.

3. The system of claim 2, wherein the processor is configured to aggregate data over one or more device usage days.

4. The system of claim 2, wherein the processor is configured to aggregate data over one or more device part usage days.

5. The system of claim 1, wherein the non-machine data includes one or both of sensor readings and assay data associated with an instance of use of a device included in the plurality of devices.

6. The system of claim 5, wherein the non-machine data includes one or more of the following: information about patient exams, tests, assays, or studies run on the device; attributes such as test or assay type, different sensor readings, whether a test was completed successfully, and warnings as well as errors during a test or self-test before the actual test; a test start time, duration, and test result; one or more sensor readings for operating conditions within a device and external to the device, including one or more of ambient temperature, ambient pressure, ambient humidity, device temperature, device pressure, and device humidity; and one or device attributes, including one or more of device age, device model, device location, part model, part manufacturer, part manufacturing date, part age, software version.

7. The system of claim 1, wherein the processor is configured to infer the part failure date based at least in part on a part replacement.

8. The system of claim 7, wherein the part replacement date is determined based on machine data.

9. The system of claim 7, wherein the part replacement date is determined based on information other than machine data.

10. The system of claim 1, wherein the processor is configured to infer the part failure date based at least in part on non-usage of the part for an abnormally long period.

11. The system of claim 1, wherein the processor is configured to include in the dataset S data associated with a first window W1 comprising a number of days immediately prior to part failure.

12. The system of claim 7, wherein the processor is configured to include in the dataset S one or more logged events that occurred with higher frequency in the window W1 than in a window W3 that preceded the window W1.

13. The system of claim 8, wherein the processor is configured to exclude from the dataset S data associated with a window W2 that occurred subsequent to the end of the window W3 but prior to the start of the window W1.

14. The system of claim 1, wherein the non-machine data includes data used to programmatically engineer one or more meta features, including without limitation one or more of a statistical feature, a static feature, a sensor feature, and a service history-based feature.

15. The system of claim 1, wherein the processor is configured to label as "bad" data associated with a window immediately preceding part failure.

16. The system of claim 1, wherein the processor is configured to label as "unknown" data associated with a window that starts at or after the end of the second window and ends at or prior to the start of the first window.

17. The system of claim 1, wherein the processor is configured to organize and label data by part and date.

18. The system of claim 15, wherein the processor is configured to engineer features for each date for which data is available for a given part and to store a row of data comprising said features for each part and date combination.

19. The system of claim 16, wherein the processor is further configured to programmatically generate a label for each such row of data.

20. The system of claim 1, wherein the aggregation rule is included in a configurable set of aggregation rules.

21. A method, comprising:

receiving data associated with a plurality of devices, the plurality of devices comprising a population of devices of a same device type each having a same target part subject to failure and the data for each device comprising machine data comprising a hundred or more logged events per device per day and non-machine data, for ninety or more days and fifty or more devices; and determining based on the received data, for each of at least a subset of the plurality of devices, a part failure date on which the target part failed in that device;

creating a dataset S comprising for each device in which the target part failed a set of one or both of errors and warnings logged in one or more windows W preceding the failure date on which the part failed combined with non-machine data associated with use of the device and part in the one or more windows W preceding the failure date;

using the dataset S to programmatically engineer a set of features usable to predict failure of the target part, the set of features including one or more features that are not based on logged warning or error events;

for each device in which the target part failed, programmatically labeling data associated with a first window of time prior to part failure as "positive" and labeling data associated with a second window of time prior to the first window of time as "negative";

for each device in which the target part has not failed, programmatically labeling data associated with a first window of time prior to a buffer period as "negative";

aggregating at least a subset of the labeled data according to an aggregation rule; and using the labeled and aggregated data to train a machine learning model configured to be used to predict failure of the target part in a device based on data from that device, including by computing from the data features corresponding to the programmatically engineered set of features.

22. A computer program product embodied in a non-transitory computer readable medium and comprising computer instructions for:
receiving data associated with a plurality of devices, the plurality of devices comprising a population of devices of a same device type each having a same target part subject to failure and the data for each device comprising machine data comprising a hundred or more logged events per device per day and non-machine data, for ninety or more days and fifty or more devices; and
determining based on the received data, for each of at least a subset of the plurality of devices, a part failure date on which the target part failed in that device;
creating a dataset S comprising for each device in which the target part failed a set of one or both of errors and warnings logged in one or more windows W preceding the failure date on which the part failed combined with non-machine data associated with use of the device and part in the one or more windows W preceding the failure date;
using the dataset S to programmatically engineer a set of features usable to predict failure of the target part, the set of features including one or more features that are not based on logged warning or error events;
for each device in which the target part failed, programmatically labeling data associated with a first window of time prior to part failure as "positive" and labeling data associated with a second window of time prior to the first window of time as "negative";
for each device in which the target part has not failed, programmatically labeling data associated with a first window of time prior to a buffer period as "negative";
aggregating at least a subset of the labeled data according to an aggregation rule; and
using the labeled and aggregated data to train a machine learning model configured to be used to predict failure of the target part in a device based on data from that device, including by computing from the data features corresponding to the programmatically engineered set of features.

* * * * *